US010817736B2

(12) United States Patent
Banvait et al.

(10) Patent No.: US 10,817,736 B2
(45) Date of Patent: Oct. 27, 2020

(54) SYSTEM AND METHODS FOR IDENTIFYING UNOCCUPIED PARKING POSITIONS

(71) Applicant: Ford Motor Company, Dearborn, MI (US)

(72) Inventors: Harpreestsingh Banvait, Dearborn, MI (US); Ashley Elizabeth Micks, Dearborn, MI (US); Jinesh J. Jain, Dearborn, MI (US); Scott Vincent Myers, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/342,595

(22) PCT Filed: Oct. 19, 2016

(86) PCT No.: PCT/US2016/057748
§ 371 (c)(1),
(2) Date: Apr. 17, 2019

(87) PCT Pub. No.: WO2018/075036
PCT Pub. Date: Apr. 26, 2018

(65) Prior Publication Data
US 2019/0266422 A1   Aug. 29, 2019

(51) Int. Cl.
*G06K 9/00* (2006.01)
*G08G 1/14* (2006.01)
(Continued)

(52) U.S. Cl.
CPC ......... *G06K 9/00812* (2013.01); *B60W 30/06* (2013.01); *B62D 15/0285* (2013.01);
(Continued)

(58) Field of Classification Search
None
See application file for complete search history.

(56) References Cited

U.S. PATENT DOCUMENTS 7,602,312 B2   10/2009   Danz et al.
8,600,786 B2   12/2013   Stefik et al.
(Continued)

FOREIGN PATENT DOCUMENTS

| CN | 104608715 A | 5/2015 |
| DE | 102004035539 A1 | 3/2006 |
| DE | 102009039086 A1 | 3/2011 |

OTHER PUBLICATIONS

Search Report and Written Opinion issued in International Application No. PCT/US2016/057748, dated Jan. 10, 2017 (13 pages).

*Primary Examiner* — Chico A Foxx
(74) *Attorney, Agent, or Firm* — Brandon Hicks; Eversheds Sutherland (US) LLP

(57) ABSTRACT

A vehicle includes one or more laterally mounted microphones and a controller programmed to detect a signature of an unoccupied position adjacent the vehicle in outputs of the microphones. The signature may be identified using a machine learning algorithm. In response to detecting an unoccupied position, the controller may invoke autonomous parking, store the location of the unoccupied position for later use, and/or report the unoccupied position to a server, which then informs other vehicles of the available parking. The unoccupied position may be verified by evaluating whether map data indicates legal parking at that location. The unoccupied position may also be confirmed with one or more other sensors, such as a camera, LIDAR, RADAR, SONAR, or other type of sensor.

20 Claims, 6 Drawing Sheets

(51) Int. Cl.
  *B60W 30/06* (2006.01)
  *G01S 15/93* (2020.01)
  *G01S 15/931* (2020.01)
  *G01S 13/931* (2020.01)
  *B62D 15/02* (2006.01)
  *G01C 21/36* (2006.01)
  *G01S 5/22* (2006.01)
  *G01S 13/86* (2006.01)
  *G01S 15/86* (2020.01)
  *G01S 17/931* (2020.01)
  *G01S 5/18* (2006.01)
  *G08G 1/16* (2006.01)

(52) U.S. Cl.
  CPC ............ *G01C 21/3685* (2013.01); *G01S 5/22* (2013.01); *G01S 13/86* (2013.01); *G01S 13/931* (2013.01); *G01S 15/86* (2020.01); *G01S 15/931* (2013.01); *G01S 17/931* (2020.01); *G08G 1/14* (2013.01); *G08G 1/143* (2013.01); *G01S 5/18* (2013.01); *G01S 2013/9314* (2013.01); *G01S 2013/93274* (2020.01); *G01S 2015/935* (2013.01); *G08G 1/168* (2013.01)

(56) References Cited

U.S. PATENT DOCUMENTS

| | | | | |
|---|---|---|---|---|
| 9,123,245 | B2 | 9/2015 | Gruteser et al. | |
| 9,483,943 | B2* | 11/2016 | Lee | G08G 1/14 |
| 9,754,173 | B2* | 9/2017 | Kim | G06K 9/00798 |
| 2003/0160717 | A1* | 8/2003 | Mattes | G01S 13/931 |
| | | | | 342/70 |
| 2006/0136544 | A1* | 6/2006 | Atsmon | A63H 3/28 |
| | | | | 709/200 |
| 2010/0106372 | A1* | 4/2010 | Watanabe | B62D 15/0285 |
| | | | | 701/41 |
| 2010/0246327 | A1* | 9/2010 | Yoshida | G01S 7/52003 |
| | | | | 367/103 |
| 2011/0080304 | A1 | 4/2011 | Toledo et al. | |
| 2012/0139716 | A1* | 6/2012 | Nagamine | B60Q 9/004 |
| | | | | 340/438 |
| 2012/0262305 | A1* | 10/2012 | Woodard | G08G 1/144 |
| | | | | 340/932.2 |
| 2013/0113936 | A1 | 5/2013 | Cohen et al. | |
| 2014/0121883 | A1* | 5/2014 | Shen | B62D 15/0285 |
| | | | | 701/28 |
| 2014/0347196 | A1 | 11/2014 | Schulz et al. | |
| 2015/0256928 | A1* | 9/2015 | Mizuno | G01S 15/08 |
| | | | | 381/56 |
| 2015/0379873 | A1 | 12/2015 | Tippelhofer et al. | |
| 2016/0063861 | A1* | 3/2016 | Lee | G08G 1/14 |
| | | | | 340/932.2 |
| 2016/0084958 | A1* | 3/2016 | Kim | G01S 7/521 |
| | | | | 367/96 |
| 2016/0110619 | A1* | 4/2016 | Kim | G05D 1/0255 |
| | | | | 382/104 |
| 2017/0045369 | A1* | 2/2017 | Kim | G08G 1/096741 |
| 2017/0193825 | A1* | 7/2017 | Schlechter | G08G 1/005 |
| 2018/0018869 | A1* | 1/2018 | Ahmad | G05D 1/0246 |
| 2018/0025640 | A1* | 1/2018 | Micks | G08G 1/142 |
| | | | | 340/932.2 |
| 2018/0124354 | A1* | 5/2018 | Aarrestad | H04R 1/403 |
| 2018/0222470 | A1* | 8/2018 | Seo | B60W 30/06 |
| 2018/0244286 | A1* | 8/2018 | Sakai | B60R 1/00 |
| 2019/0162850 | A1* | 5/2019 | Kempf | G01S 15/931 |

* cited by examiner

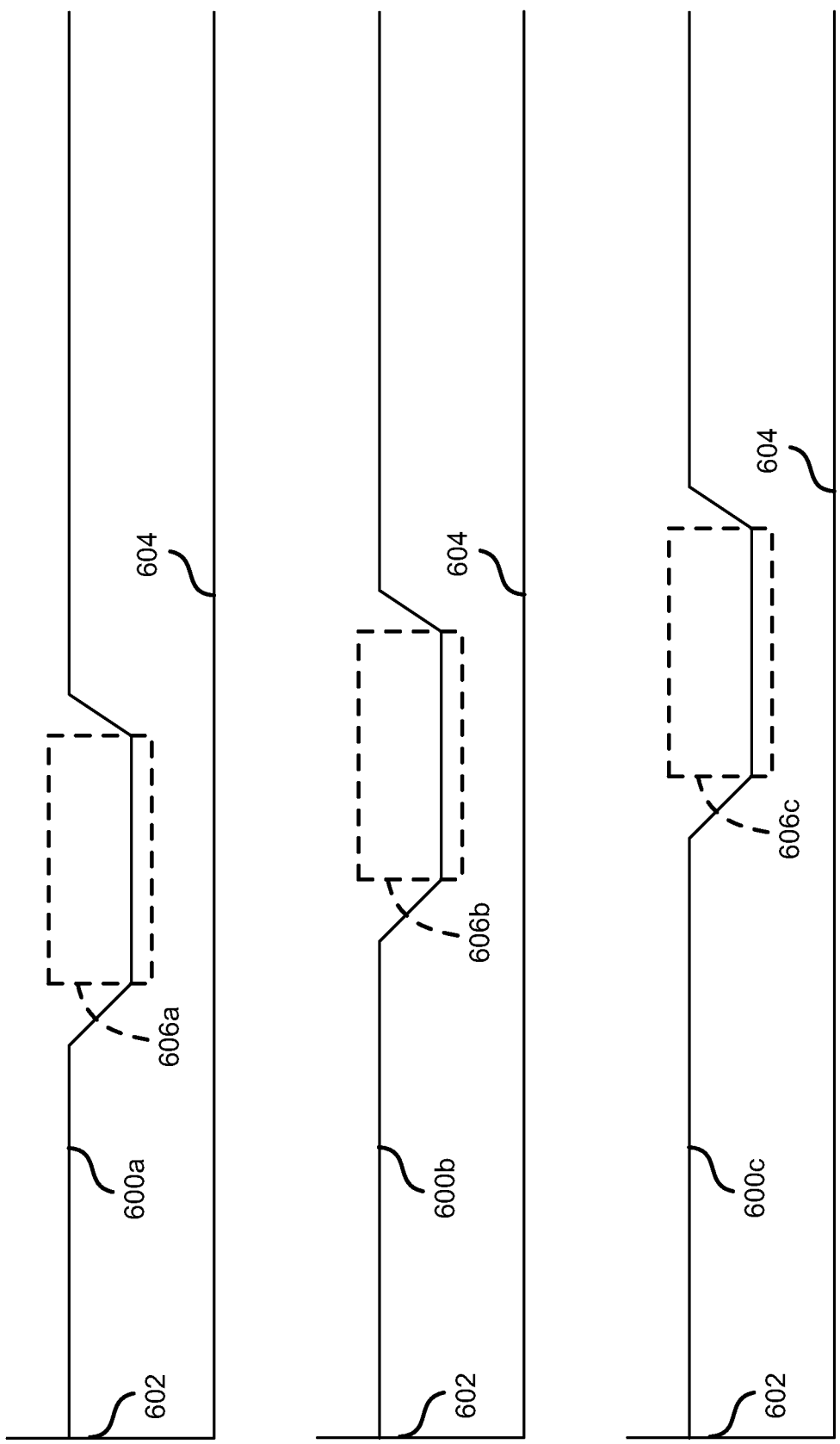

SYSTEM AND METHODS FOR IDENTIFYING UNOCCUPIED PARKING POSITIONS

BACKGROUND

Field of the Invention

This invention relates to a sensor system and method for a vehicle.

Background of the Invention

Finding a parallel parking spot in an urban environment can be very challenging. A significant amount of fuel is consumed in finding parking. Finding parking spots right next to the vehicle can be a challenging problem especially when the vehicle is traveling at medium speed while the driver searches for a parking spot, particularly in heavy traffic.

The systems and methods disclosed herein provide an improved approach for identifying parking spots from a moving vehicle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 is a diagram illustrating correlation of microphone signals in accordance with an embodiment of the present invention.

DETAILED DESCRIPTION

Figure 1:
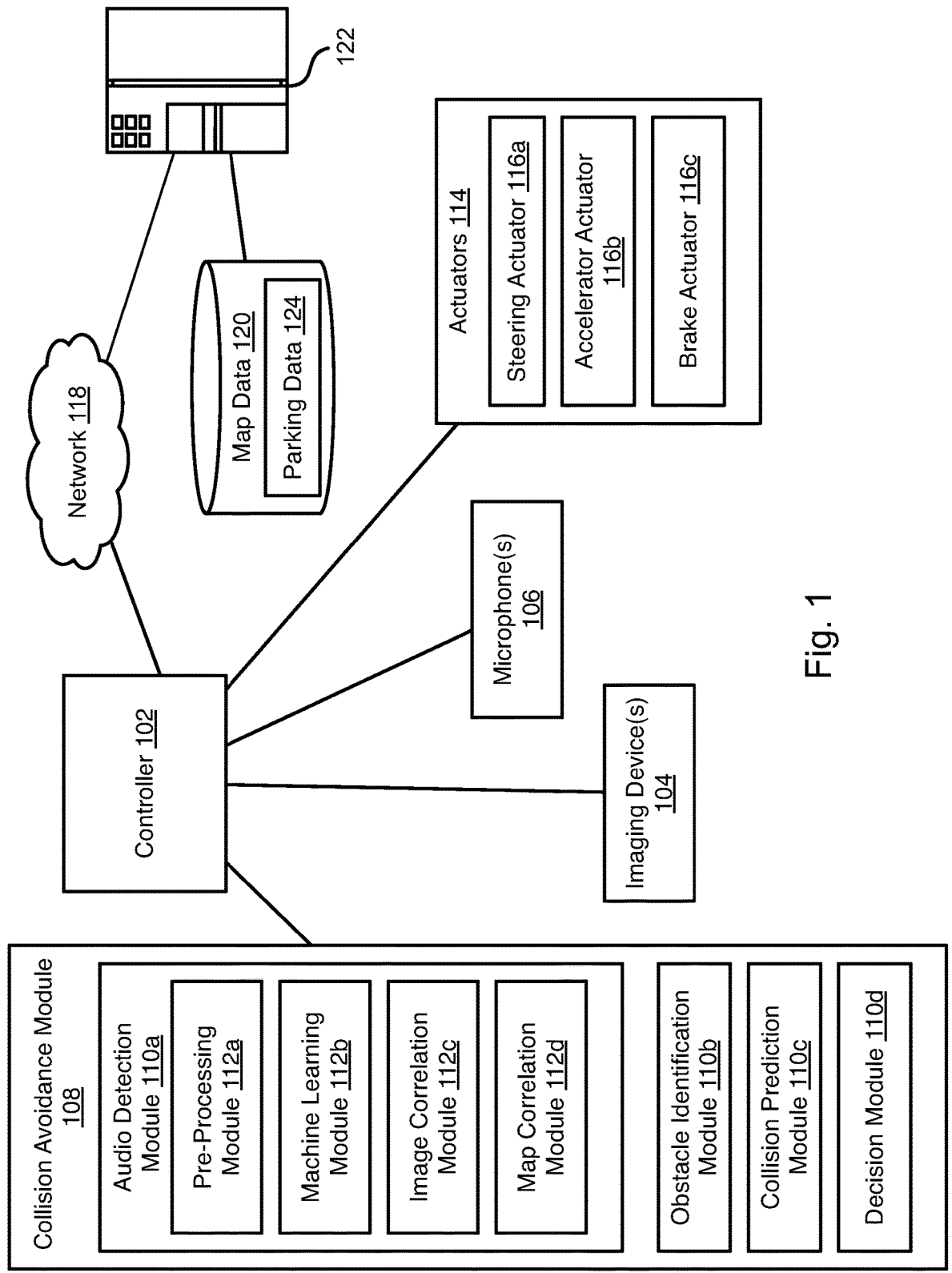
FIG. 1 is a schematic block diagram of a system for implementing embodiments of the invention.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. The controller 102 may receive one or more image streams from one or more imaging devices 104. For example, one or more cameras may be mounted to the vehicle and output image streams received by the controller 102. The controller 102 may receive one or more audio streams from one or more microphones 106. For example, one or more microphones 106 or microphone arrays 106 may be mounted to the vehicle and output audio streams received by the controller 102. The microphones 106 may include directional microphones having a sensitivity that varies with angle.

The controller 102 may execute a collision avoidance module 108 that receives the image streams and audio streams and identifies possible obstacles and takes measures to avoid them.

Outputs of other sensors may be used to identify obstacles. For example, imaging devices 104 may include sensors such as RADAR (Radio Detection and Ranging), LIDAR (Light Detection and Ranging), SONAR (Sound Navigation and Ranging), and the like. Accordingly, the "image streams" received by the controller 102 may include one or both of optical images detected by a camera and objects and topology sensed using one or more other devices. The controller 102 may then analyze both images and sensed objects and topology in order to identify potential obstacles The collision avoidance module 108 may include an audio detection module 110a. The audio detection module 110a may include an audio pre-processing module 112a that is programmed to process the one or more audio streams in order to accentuate a sound signature corresponding to an unoccupied parking space. The audio detection module 110a may further include a machine learning module 112b that implements a model that evaluates the processed audio streams from the pre-processing module 112a and attempts to detect the signature of an unoccupied parking position. The machine learning module 112b may output a confidence score indicating a likelihood that a classification is correct. The function of the modules 112a, 112b of the audio detection module 110a is described in greater detail below with respect to the method 500 of FIG. 5.

The audio detection module 110a may further include an image correlation module 112c that is programmed to evaluate image outputs from the one or more imaging devices 104 and attempt to identify an unoccupied parking position. In particular, the image correlation module 112c may be used to confirm the presence of an unoccupied parking position detected using audio data according to the methods disclosed herein.

The audio detection module 110a may further include a map correlation module 112d. The map correlation module 112d evaluates map data to determine whether a parking position such as a legal parallel parking position or angled parking position is located at a location determined to be unoccupied according to the methods disclosed herein. If so, the unoccupied parking position may be stored for later use or reported to a server for use by other vehicles.

The collision avoidance module 108 may further include an obstacle identification module 110b, a collision prediction module 110c, and a decision module 110d. The obstacle identification module 110b analyzes the one or more image streams and identifies potential obstacles, including people, animals, vehicles, buildings, curbs, and other objects and structures. In particular, the obstacle identification module 110b may identify vehicle images in the image stream.

The collision prediction module 110c predicts which obstacle images are likely to collide with the vehicle based on its current trajectory or current intended path. The collision prediction module 110c may evaluate the likelihood of collision with objects identified by the obstacle identification module 110b as well as obstacles detected using the audio detection module 110a. In particular, vehicles having their engines running identified with an above-threshold confidence by the audio detection module 110a may be added to a set of potential obstacles, particularly the potential movements of such vehicles. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

In embodiments disclosed herein, the collision avoidance module 108 may perform autonomous parking. In particular, the collision avoidance module 108 may autonomously park the vehicle in an unoccupied parking position identified according to the methods disclosed herein by means of the actuators 114.

The controller 102 may be network-enabled and retrieve information over a network 118. For example, map data 120 may be accessed from a server system 122 in order to identify potential parking spaces near the autonomous vehicle housing the controller 102. The map data 120 may include parking data 124 that records the location of legal parking positions. The parking data 124 may further include status information that reflects a status of a parking position. A status of a parking position may include such statuses as "occupied," "unknown," and "unoccupied." In some embodiments, where the status is "unoccupied," the parking data may record the time the parking position was reported as unoccupied according to the methods disclosed herein.

Unoccupied parking positions may be reported to the server system 122 when determined according to the methods disclosed herein, which updates the parking data 124. The controller 102 may further report when the vehicle is parked in a parking position, such as when the controller 102 autonomously parks in the parking position.

Figure 2:
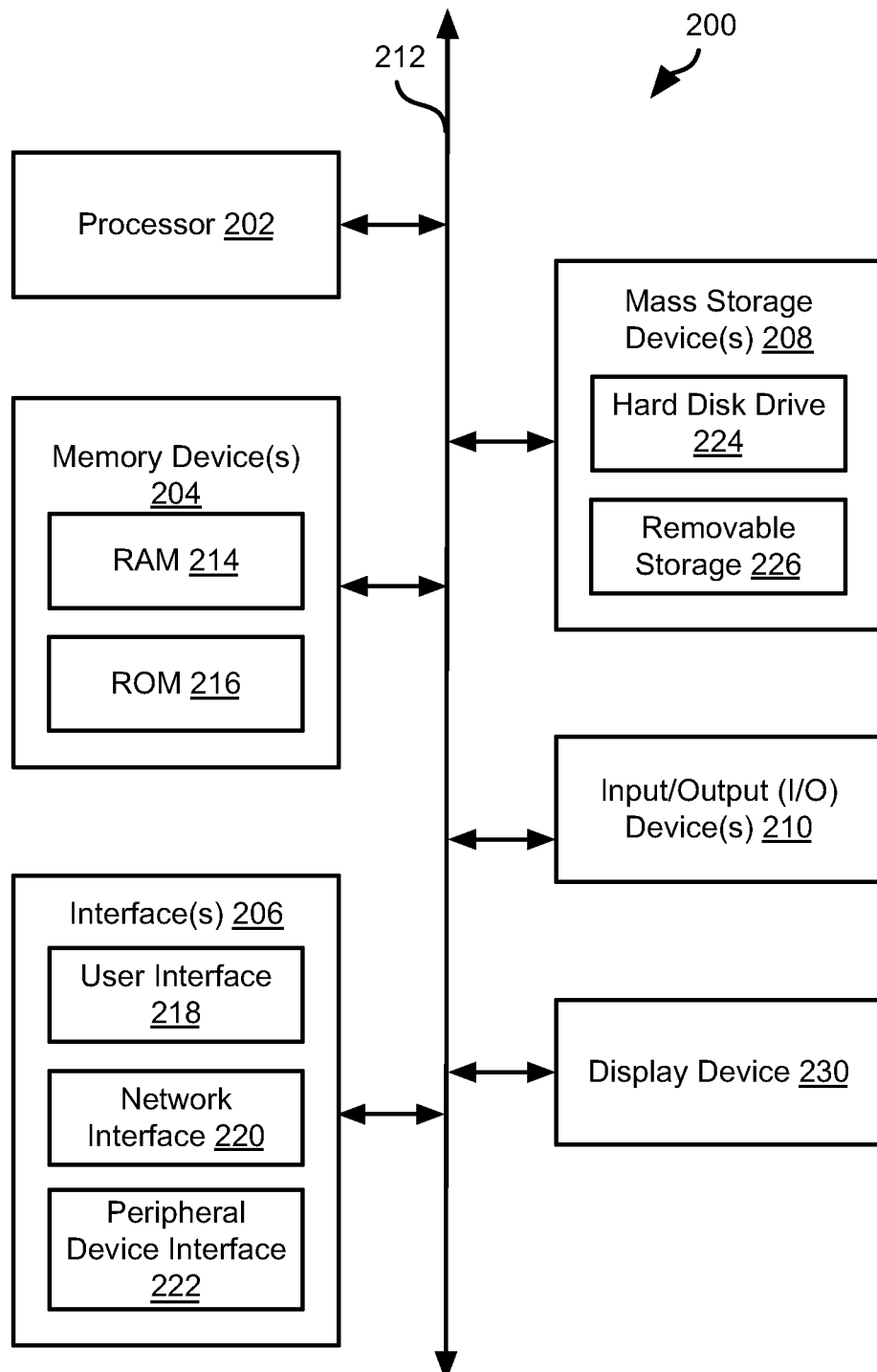
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 and server system 122 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
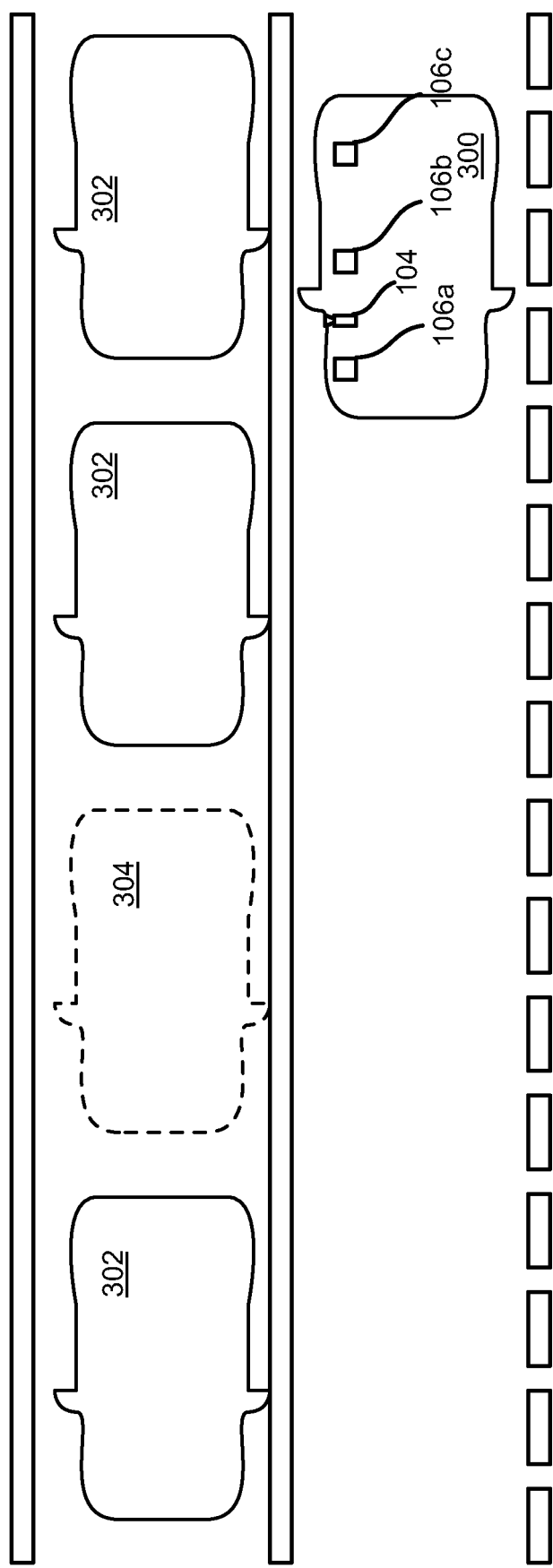
FIG. 3 is a diagram illustrating a scenario in which unoccupied parking positions may be detected using auditory data in accordance with an embodiment of the present invention.

Turning now to FIG. 3, in many instances a vehicle housing the controller 102 (hereinafter the vehicle 300) may drive along a street permitting parallel or angled parking. Many of the available park locations may be occupied with other vehicles 302 and other positions 304 may be unoccupied. The microphones 106 may include one or more microphones 106a-106c positioned along the vehicle, such as along the right side in jurisdictions where drivers drive on the right side of the road. The following disclosure assumes travel along the right side of the road. References to right or left sides of a vehicle would be reversed in the case of left side driving.

The vertical position of the microphones 106a-106c may be positioned within the typical height of a vehicle, e.g. between 2 and 4 feet from the ground. The imaging devices 104 may further include a right-facing camera 104 that is positioned to have parking positions on the right side of the vehicle within its field of view. Other imaging sensors (e.g. LIDAR, RADAR, SONAR) may have the right side of the vehicle within its field of view.

As the vehicle 300 passes the vehicles 302 and empty parking positions 304, the outputs of the microphones 106a-106c will detect a markedly different sound signature. For example, sound that may be blocked by the parked vehicles 302 will not be blocked by the empty parking position 304. Likewise, sound reflected onto the microphones 106a-106c by the vehicles 302 will not be reflected to the same extent at the empty parking position 304. Accordingly, a distinct change in the characteristics of detected sound will occur at the empty parking position 304.

The machine learning module 112b may be trained to detect this distinct change in characteristics of detected sound. For example, a training data set may include an audio file recorded as a vehicle passes a row of occupied and unoccupied parking positions at a given speed. The desired output for the audio file may be a set of status indicators indicating whether a particular point in time in the audio file corresponds to sound recorded while passing an occupied or unoccupied parking position. For example, a status indicator may be included in the desired output and corresponding to a set of N samples, where N is a value from 1 to 1000, or some other value. The status indicators may simply be a binary value: 1 for occupied and 0 for unoccupied.

Various pairs of audio files and set of desired outputs may be used to train the machine model. The audio files may be recorded under various traffic conditions and at various speeds in order to train the model for multiple situations. In some embodiments, the vehicle speed may be input for a given pair of audio file and set of desired outputs such that the machine learning model may be trained for specific conditions that may vary in the signature of an unoccupied parking position.

Figure 4:
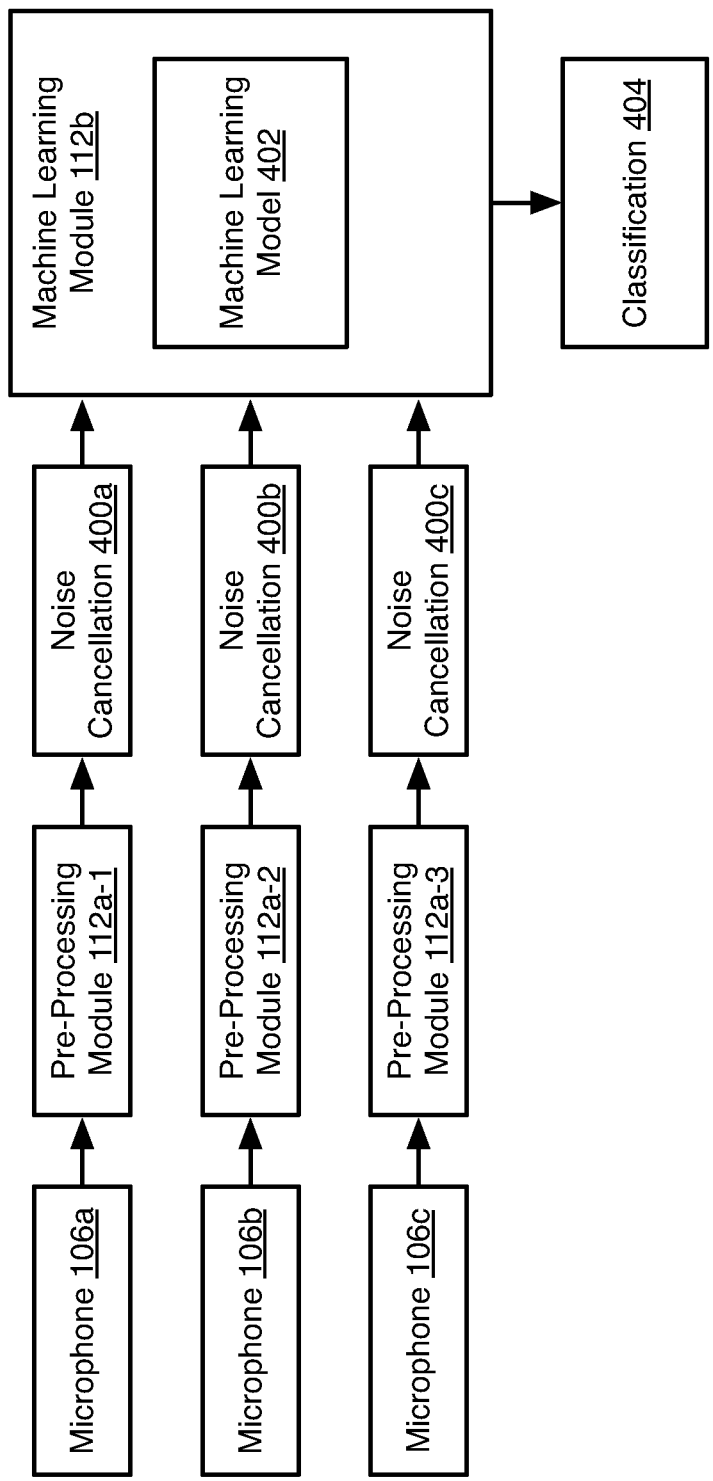
FIG. 4 is a schematic block diagram of components for detecting unoccupied parking positions using auditory data in accordance with an embodiment of the present invention.

Referring to FIG. 4, the output signal of each microphone 106a-106c may be input to a corresponding pre-processing module 112a-1-112a-3. The output of each pre-processing module 112a-1-112a-3 may be further processed by a noise cancellation filter 400a-400c. The output of the noise cancellation modules 400a-400c may then be input to the machine learning module 112b. In particular, the outputs of the noise cancellation modules 400a-400c may be input to a machine learning model 402 that outputs a classification 404 of the outputs as corresponding to passing an occupied or unoccupied parking position. The machine learning model 402 may further output a confidence in the classification.

The pre-processing modules 112a-1-112a-3 may process the raw outputs from the microphones 106a-106c and produce processed outputs that are input to the noise cancellation modules 400a-400c or directly to the machine learning module 112b. The processed outputs may be a filtered version of the raw outputs, the processed outputs having enhanced audio features relative to the raw outputs. The enhanced audio features may be segments, frequency bands, or other components of the raw outputs that are particularly useful in identifying occupied and unoccupied parking positions. Accordingly, the pre-processing module 112a-1-112a-3 may include a bandpass filter that passes through a portion of the raw outputs in a frequency band corresponding to sounds generated by vehicles and vehicle engines while blocking portions of the raw outputs outside of that frequency band. The pre-processing modules 112a-1-112a-3 may be digital filters having coefficients chosen to pass signals having spectral content and/or a temporal profile corresponding to a vehicle engine or other vehicle noise (e.g. wind noise), such as an adaptive filter with experimentally selected coefficients that will pass through vehicle-generated sounds while attenuating other sounds. The output of the pre-processing modules 112a-1-112a-3 may be a time domain signal or a frequency domain signal, or both. The output of the pre-processing modules 112a-1-112a-3 may include multiple signals, including signals in one or both of the time domain and frequency domain. For example, signals that are the result of filtering using different pass-band filters may be output either in the frequency or time domain.

The noise cancellation modules 400a-400c may include any noise cancellation filter known in the art or implement any noise cancellation approach known in the art. In particular, the noise cancellation modules 400a-400c may further take as inputs the speed of the vehicle 300, a rotational speed of an engine of the vehicle 300 or other information describing a status of the engine, a speed of a ventilation fan of the vehicle 300, or other information. This information may be used by the noise cancellation modules 400a-400c to remove noise caused by the engine and fan and vehicle wind noise.

In some embodiments, the noise reflected from an occupied parking position may correspond to the wind noise and engine noise caused by the vehicle 300. Accordingly, the output of the noise cancellation modules 400a-400c may be compared to an output of the pre-processing modules 112a-1-112a-3 on order to determine variation in reflections of the vehicle's own engine and wind noise from parked cars or empty parking positions.

The machine learning model 402 may be a deep neural network, however other types of machine learning models may be used, such as a decision tree, clustering, Bayesian network, genetic, or other type of machine learning model. The machine learning model 402 may be trained with various types of noises in various types of situations as noted above with respect to FIG. 3.

Figure 5:
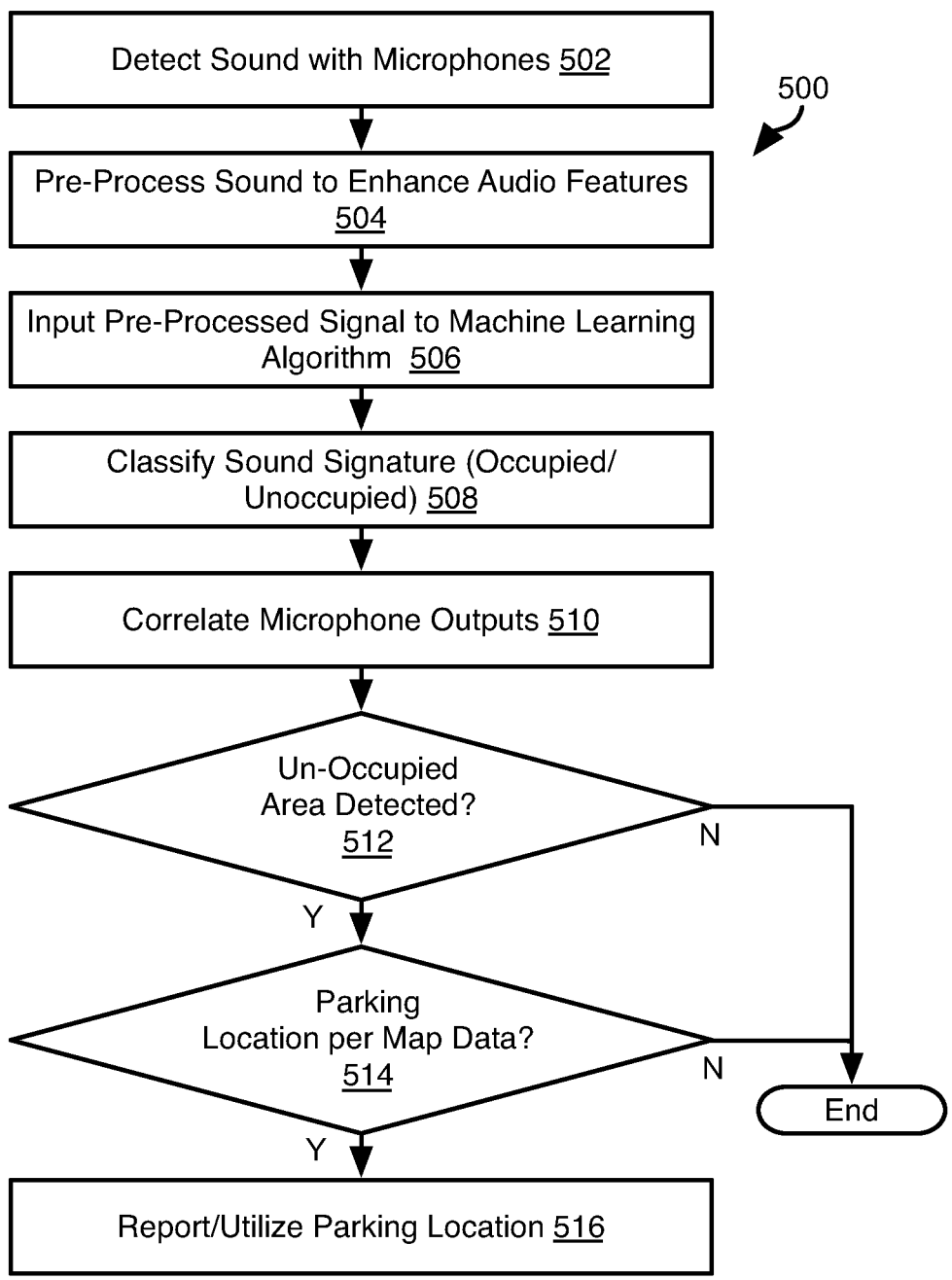
FIG. 5 is a process flow diagram of a method for detecting unoccupied parking positions in accordance with an embodiment of the present invention.

FIG. 5 illustrates a method 500 that may be executed by the controller 102 by processing audio signals from the microphones 106a-106c. The method 500 may include detecting 502 audio signals representing detected sounds using the microphones 106a-106c and pre-processing 504 the audio signals to enhance audio features. This may include performing any of the filtering functions described above with respect to the pre-processing modules 112a-1-112a-3. In particular, pre-processing 504 may include generating one or more pre-processed signals in the time domain or frequency domain, each output may be a band-pass filtered version of an audio signal from one of the microphones 106a-106c or may be filtered or otherwise processed using other techniques, such as using an adaptive filter or other audio processing technique. Pre-processing 504 may further include performing noise cancellation on either the input or output of the pre-processing modules 112a-1-112a-3 as described above with respect to the noise cancellation modules 400a-400c.

The method 500 may further include inputting 506 the pre-processed signals into the machine learning model 402. The machine learning model 402 will then classify 508 the sound, i.e. the attributes of the audio features in the pre-processed signals will be processed according to the machine learning model 402, which will then output one or more classifications and confidence scores for the one or more classifications. In the illustrated embodiment, sound may be classified as indicating an adjacent parked car or an adjacent empty parking position.

The method 500 may include attempting to correlate 510 the classifications of sound from the various microphones 106a-106c. For example, FIG. 6 includes plots wherein the vertical axis 602 represents amplitude of a sample of detected sound and the horizontal axis 604 represents time, e.g. a position of a sample in a sequence of samples.

Plots 600a-600c represent the outputs of microphones 106a-106c, respectively. Regions 606a-606c represent regions of the plots 600a-600c, respectively wherein the signature of an unoccupied parking position was detected by the machine learning model. As is apparent, the regions 606a-606c are offset due to the microphones 106a-106c being located at different longitudinal positions on the vehicle 300.

Correlating 510 may therefore include determining whether the locations of the regions 606a-606c are consistent with all the microphones 106a-106c passing an unoccupied parking position. The temporal offset between microphones 106a and 106b could be estimated be $D_{ab}/V$, where $D_{ab}$ is the longitudinal separation between microphones 106a, 106b and V is the velocity of the vehicle 300 when the signals were detected. Likewise, the temporal offset between microphones 106a and 106c could be estimated as $D_{ac}/V$, where $D_{ac}$ is the longitudinal separation between microphones 106a, 106c.

Correlating 510 the outputs of the microphones may include aligning the outputs of the machine learning model to counter the delay caused by the longitudinal offsets. Where the aligned outputs of the machine learning model for the microphones 106a-106c indicate the same signature (e.g., unoccupied), then the confidence in the determination that the parking position is unoccupied may be increased.

For example, a parking position may only be determined to be unoccupied if all three (or some other number where more microphones are used) signatures for all three microphones determine a parking position to be unoccupied.

In some embodiments, the multiple microphones 106a-106c, or microphones 106a-106c embodied as microphone arrays, may be used to detect an angle to an unoccupied parking position. Specifically, time delays between the time of detection of an unoccupied parking position by the various microphones 106a-106c may be used to determine the direction to the unoccupied parking position using any triangulation algorithm known in the art.

The method 500 may include determining 512 whether an unoccupied parking position has been detected according to one or both of the classification step 508 and the correlation step 510. For example, step 512 may include evaluating a duration of a portion of the outputs of the microphones 106a-106c that was determined to indicate an unoccupied position to determine whether the unoccupied position is large enough to permit parking. For example, an unoccupied parking position may be determined to be identified if the duration is at least as large as L/V, where L is the length of the vehicle plus a distance required to maneuver into a parallel parking position and V is the velocity of the vehicle when the microphone outputs were measured.

If an unoccupied position is determined 512 to have been detected, the method 500 may include evaluating 514 whether map data indicates a legal parking position at that area. For example, the location of the vehicle 300 may be determined, such as using a global positioning system (GPS) receiver, at the same time the microphone outputs are recorded. Accordingly, a given time position in the output of the microphones 106a-106c may be related to the location of the vehicle at the time the output was detected. The location of regions in the output determined to indicate an unoccupied position may therefore be determined from to corresponding location measurements. The corresponding location measurements may be evaluated to determine whether map data indicates a legal parking location at those locations. If so, then the unoccupied parking position may be reported 516, stored for later use, or autonomous parking in the unoccupied parking position may be executed by the controller 102.

Reporting 516 may include reporting the unoccupied position to the server system 122. Other controllers 102 or other mobile devices may then receive reports of currently unoccupied parking positions from the server system as reported by multiple other vehicles. The controllers 102 of the other vehicles may then navigate or provide navigation instructions to these unoccupied parking positions.

Various modifications to the method 500 may be performed. For example, although auditory data alone may be used to detect an unoccupied parking position, the output of imaging devices 104 (camera, LIDAR, RADAR, SONAR, etc.) may also be used to detect an unoccupied parking position.

For example, where an unoccupied parking position is detected using auditory data, as described above, measurements of the detected unoccupied parking position using the imaging devices 104 may also be evaluated to verify that a vehicle or other obstacle is not located in the unoccupied parking position. In such embodiments, step 516 may only be performed where measurements using the imaging devices 104 confirm an unoccupied parking position.

Reporting 516 the unoccupied parking position may include transmitting some or all of the outputs of the microphones 106a-106c, the classifications of the microphone outputs according to the machine learning model, and measurements of the unoccupied parking position from the imaging devices 104 (e.g. images from a camera or a point cloud measured using LIDAR, RADAR, and/or SONAR). The server system 122 may use this data to verify the unoccupied parking position.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for a vehicle comprising:
one or more microphones mounted to the vehicle; and
a controller programmed to—
detect a signature of an unoccupied position adjacent the vehicle in one or more outputs of the one or more microphones;
retrieve map data for a current location of the vehicle;
evaluate whether the map data indicates at least one parking area at the unoccupied position; and
if the map data indicates the at least one parking area at the unoccupied position, perform at least one of (a) store the unoccupied position, and (b) transmit the unoccupied position to a server.

2. The system of claim 1, wherein the controller is further programmed to:
detect the signature of the unoccupied position by inputting the one or more outputs into a machine learning model.

3. The system of claim 2, wherein the machine learning model is a deep neural network.

4. The system of claim 1, wherein the controller is further programmed to autonomously park the vehicle in the unoccupied position.

5. The system of claim 1, wherein the controller is further programmed to detect the signature of the unoccupied position adjacent the vehicle by filtering the one or more audio streams to obtain one or more filtered signals.

6. The system of claim 1, wherein the one or more microphones include a plurality of microphones distributed longitudinally along the vehicle; and
wherein the controller is further programmed to correlate occurrence of the signature of the unoccupied position in outputs of the plurality of microphones with temporal offsets corresponding to a speed of the vehicle.

7. The system of claim 6, wherein correlating occurrence of the signature of the unoccupied position in the outputs of the plurality of microphones with the temporal offsets corresponding to the speed of the vehicle further comprises:
determining a first signature of the unoccupied position in a first output of a first microphone of the plurality of microphones;
determining a second signature of the unoccupied position in a second output of a first microphone of the plurality of microphones; and
determining a match between the first signature and the second signature based on a temporal offset between the first microphone and the second microphone.

8. The system of claim 1, further comprising one or more additional sensors mounted to the vehicle;
wherein the controller is further programmed to confirm presence of the unoccupied position according to outputs of the one or more additional sensors.

9. The system of claim 8, wherein the one or more additional sensors include a camera.

10. The system of claim 8, wherein the one or more additional sensors include at least one of a LIDAR sensor, a RADAR sensor, and a SONAR sensor.

11. The system of claim 1, wherein evaluating whether the map data indicates the at least one parking area at the unoccupied position comprises:
determining that the map data indicates the at least one parking area at the unoccupied position is based on a match between a position of the at least one parking area and the unoccupied position; and
determining that the unoccupied position is outside of the at least one parking area based on a mismatch between the position of the at least one parking area and the unoccupied position.

12. A method for detecting parking positions, the method comprising:
providing a vehicle having one or more microphones mounted thereon;
receiving, by a controller, one or more outputs form the one or more microphones;
detecting, by the controller, a signature of an unoccupied position adjacent the vehicle in the one or more outputs of the one or more microphones;
in response to detecting the signature of the unoccupied position adjacent the vehicle,
retrieving, by one of the controller and another computer system, map data for a current location of the vehicle;
determining, by the one of the controller and the other computer system, that the map data indicates at least one parking area at the unoccupied position; and
in response to determining that the map data indicates the at least one parking area at the unoccupied position, performing, by the controller, at least one of (a) storing the unoccupied position, and (b) transmitting the unoccupied position to a server.

13. The method of claim 12, further comprising detecting the signature of the unoccupied position by inputting, by the controller, the one or more outputs into a machine learning model.

14. The method of claim 13, wherein the machine learning model is a deep neural network.

15. The method of claim 12, wherein the controller is further programmed to autonomously park the vehicle in the unoccupied position.

16. The method of claim 12, further comprising detecting a signature of an unoccupied position adjacent the vehicle by filtering the one or more audio streams to obtain one or more filtered signals.

17. The method of claim 12, wherein the one or more microphones include a plurality of microphones distributed longitudinally along the vehicle, the method further comprising correlating, by the controller, occurrence of the signature of the unoccupied position in outputs of the plurality of microphones using temporal offsets corresponding to a speed of the vehicle.

18. The method of claim 12, wherein one or more additional sensors are mounted to the vehicle and coupled to the controller, the method further comprising confirming, by the controller, presence of the unoccupied position according to outputs of the one or more additional sensors.

19. The method of claim 18, wherein the one or more additional sensors include a camera.

20. The method of claim 18, wherein the one or more additional sensors include at least one of a LIDAR sensor, a RADAR sensor, and a SONAR sensor.

* * * * *